United States Patent [19]
Itsuji et al.

[11] Patent Number: 6,053,707
[45] Date of Patent: Apr. 25, 2000

[54] CONTROL DEVICE FOR SLANTING PLATE TYPE VARIABLE CAPACITY PUMP

[75] Inventors: Yoshiyasu Itsuji; Kouji Yotsumoto; Kenji Fujita, all of Chiba, Japan

[73] Assignee: Sumitomo Heavy Industries, Ltd., Tokyo, Japan

[21] Appl. No.: 09/060,352

[22] Filed: Apr. 15, 1998

[30] Foreign Application Priority Data

Apr. 16, 1997 [JP] Japan .................................. 9-098640
Apr. 23, 1997 [JP] Japan .................................. 9-105926

[51] Int. Cl.$^7$ ...................................................... F04B 49/00
[52] U.S. Cl. ............................. 417/213; 417/20; 417/218
[58] Field of Search ............................. 417/20, 218, 219, 417/220, 221, 222.2, 300; 60/452, 329

[56] References Cited

U.S. PATENT DOCUMENTS 4,932,840   6/1990   Takeuchi et al. ........................ 417/20
5,219,584   6/1993   Itsuzi et al. ............................ 425/150
5,443,782   8/1995   Nakamura et al. .................... 264/328.1

*Primary Examiner*—Thomas N. Moulis
*Assistant Examiner*—Mahmoud M Gimie
*Attorney, Agent, or Firm*—Burns, Doane, Swecker & Mathis, LLP

[57] ABSTRACT

A control device is herein disclosed which comprises a drive piston 12p for changing the position of a slanting plate in a variable capacity pump 11, an electromagnetic proportional valve 13 for driving the drive piston, and a position detector 14 for detecting a position of the slanting plate. The control device performs a flow rate control of operating oil by controlling the electromagnetic proportional valve in accordance with a difference between a flow rate instruction value Fr for the operating oil and a position detection value from the position detector so as to change the position of the slanting plate. The control device further includes a pressure detector 18 for detecting a pressure of the operating oil supplied to an injection cylinder 10, and correcting means for correcting the flow rate instruction value on the basis of a pressure detection value from the pressure detector to output a corrected flow rate instruction value.

3 Claims, 7 Drawing Sheets

6,053,707

CONTROL DEVICE FOR SLANTING PLATE TYPE VARIABLE CAPACITY PUMP

BACKGROUND OF THE INVENTION

The present invention relates to a control device for a slanting plate type variable capacity pump, and more particularly, it relates to a control device suitable for a slanting plate type variable capacity pump for supplying pressurized operating oil to an injection cylinder of a hydraulic type injection molding machine.

A hydraulic type injection molding machine is equipped with an injection device which is driven by oil pressure. The injection device includes an injection cylinder in which an injection shaft is driven by oil pressure to advance or retreat a screw in a heat cylinder, and a hydraulic pump for supplying pressurized operating oil to the injection cylinder. For such a hydraulic pump, a slanting plate type variable capacity pump is generally used. In the injection device of the injection molding machine, injection speed or injection pressure is controlled when molten resin is injected into a mold. When injection speed is controlled, resistance by molten resin in the heat cylinder and molten resin in the mold acts on the control. The injection speed decreases as the resistance increases. In particular, when the operating speed of the screw is low, there is a case that the screw is stopped. The reason is as follows.

The injection device of a hydraulic type includes a large number of oil pipes through which the operating oil passes. In those oil pipes, there are inevitable very small leakage of the operating oil. The pressure of the operating oil acting on the injection cylinder increases as the above-mentioned resistance increases. The increase of the pressure of the operating oil brings on the increase of leakage of the operating oil. As a result, the amount of the operating oil supplied to the injection cylinder decreases. In short, as injection pressure increases, injection speed, that is, the operating speed of the screw decreases and leakage of the operating oil increases. The affection of the leakage of the operating oil therefore becomes considerable when injection speed is low.

On the other hand, as the pressure of the operating oil increases, the operating oil is compressed. Although the compression quantity of the operating oil is very little relative to that of gas, the compressibility β of the operating oil is represented by the following equation.

$$\beta = -(1/V0)\,(dV/dP),$$

where $V0$ represents the volume of the operating oil before compression, $dV$ represents the variation of the volume of the operating oil, and $dP$ represents variation of the pressure of the operating oil. Since the compression quantity of the operating oil increases as the injection pressure becomes high, the affection of the compression quantity of the operating oil therefore becomes considerable when the injection speed is low.

SUMMARY OF THE INVENTION

Accordingly, it is an object of the present invention to provide a control device for a slanting plate type variable capacity pump which is not affected by compression and leakage of operating oil from pipes and secures to obtain a good speed control performance.

The present invention is applied to a slanting plate type variable capacity pump for supplying pressurized operating oil to a hydraulic cylinder. The amount of the operating oil discharged from the variable capacity pump changes with position of a slanting plate. A control device according to the present invention includes a drive piston for changing the position of the slanting plate of the variable capacity pump, an electromagnetic proportional valve for driving the drive piston, and a position detector for detecting a position of the slanting plate. The control device controls the electromagnetic proportional valve in accordance with a difference between a flow rate instruction value for the operating oil and a position detection value from the position detector so as to change the position of the slanting plate for controlling the flow rate of the operating oil.

According to an aspect of the present invention, the control device further includes a pressure detector for detecting a pressure of the operating oil supplied to the hydraulic cylinder, and correcting section for correcting the flow rate instruction value on the basis of a pressure detection value from the pressure detector and outputting a corrected flow rate instruction value.

DESCRIPTION OF THE PREFERRED EMBODIMENTS

For easily understanding the present invention, an instance in which a conventional control device for a slanting plate type variable capacity pump is applied for an injection device in a hydraulic type injection molding machine will be described with reference to FIG. 1. The control device performs a well-known injection speed control and a well-known injection pressure control.

Figure 1:
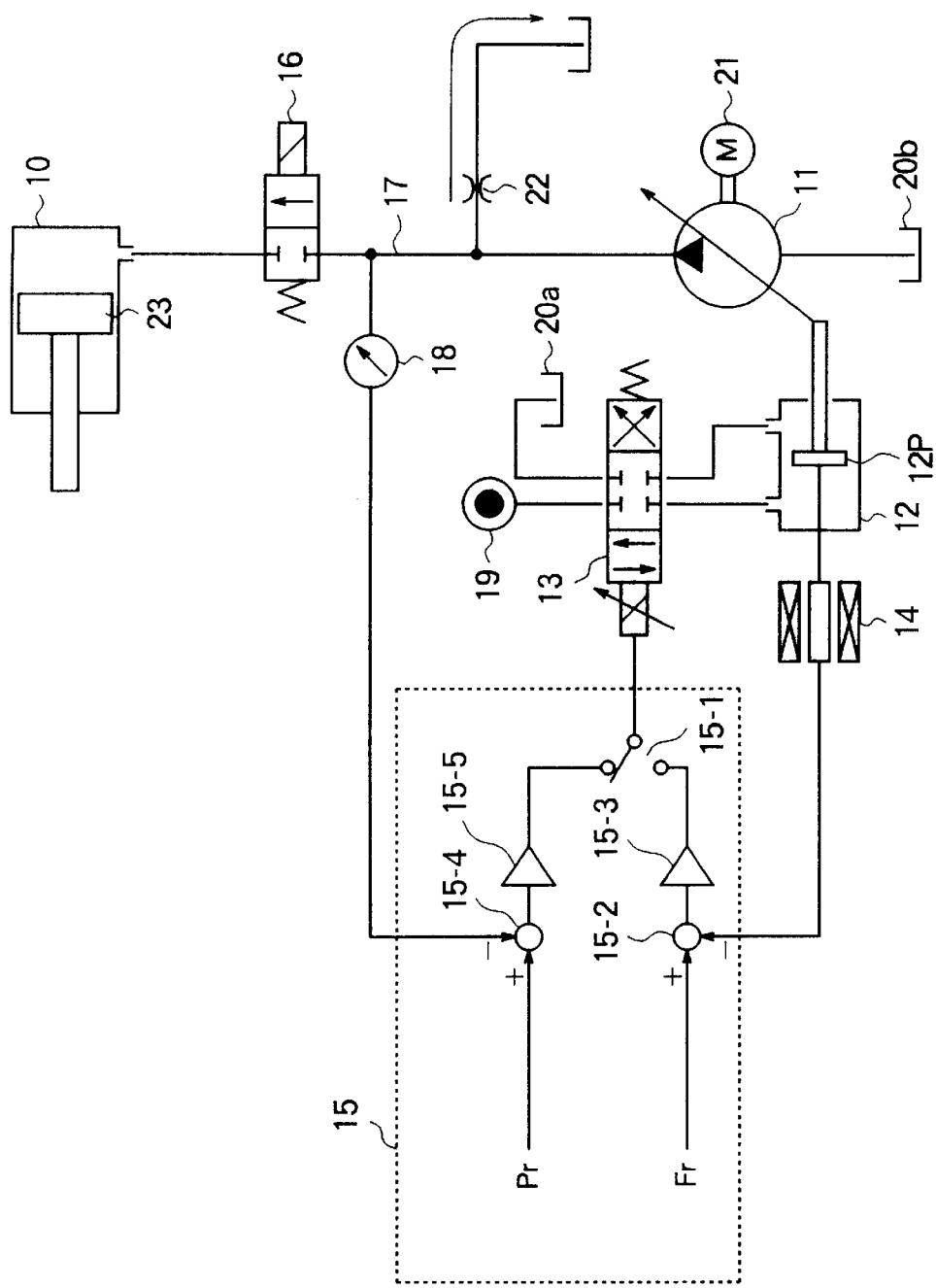
FIG. 1 is a diagram showing construction of a conventional control device for an injection device in an injection molding machine.

In FIG. 1, the control device includes a slanting plate type variable capacity pump 11 for supplying a pressurized operating oil to an injection cylinder 10, a drive piston 12p disposed in a drive cylinder 12 for changing a slanting plate in the variable capacity pump 11, an electromagnetic proportional valve 13 for driving the drive piston 12p, a position detector 14 for detecting a position of the slanting plate in the variable capacity pump 11, and a control section 15. The control section 15 includes a change-over switch 15-1 for changing over the control operation between the injection speed control and the injection pressure control. A position change of the slanting plate in the variable capacity pump 11 is in proportion to the flow rate of the operating oil discharged from the variable capacity pump 11.

When an injection speed is controlled, the change-over switch 15-1 is turned to the side of an amplifier 15-3. A position detection value, which is obtained in the position detector 14 by detecting a position of the slanting plate in the variable capacity pump 11, is fed back to the control section 15. In the control section 15, the difference between the position detection value and a flow rate instruction value Fr is obtained by a subtracter 15-2. The obtained difference is given through the amplifier 15-3 and change-over switch 15-1 into the electromagnetic proportional valve 13. The electromagnetic proportional valve 13 then makes the position of the slanting plate in the variable capacity pump 11 change to control the flow of the operating oil. In addition, the flow rate instruction value Fr and the pressure instruction value Pr are given by a main control unit (not shown).

The operating oil is supplied from the variable capacity pump 11 through a change-over valve 16 to the injection cylinder 10. A pressure detector 18 is provided in an oil pipe 17 for supplying the operating oil.

When an injection pressure is controlled, the change-over switch 15-1 is turned to the side of an amplifier 15-5. A pressure detection value, which is obtained in the pressure detector 18 by detecting a pressure of the operating oil in the oil pipe 17, is fed back to the control section 15. In the control section 15, the difference between the pressure detection value and a pressure instruction value Pr is obtained by a subtracter 15-4. The obtained difference is given through the amplifier 15-5 and the change-over switch 15-1 into the electromagnetic proportional valve 13. The electromagnetic proportional valve 13 then makes the position of the slanting plate in the variable capacity pump 11 change to control the flow rate of the operating oil.

The drive piston 12p and the electromagnetic proportional valve 13 are driven by operating oil from a constant pressure oil source 19. The oil from the drive piston 12p and the electromagnetic proportional valve 13 is returned into a tank 20a. The variable capacity pump 11 is driven by a motor 21 and the operating oil from the variable capacity pump 11 is returned into a tank 20b.

In such a hydraulic driving system, there is inevitable leakage of the operating oil at various parts of the oil pipe 17. In FIG. 1, the leakage from a throttle valve 22 symbolically represents those leakages of the operating oil.

In injection molding, resistance by molten resin in a heat cylinder and a mold acts when the injection speed is controlled. As the resistance increases, the injection speed decreases. In particular, the machine operates at a low injection speed, there is a case that a screw is stopped. The reason is as follows.

Figure 2:
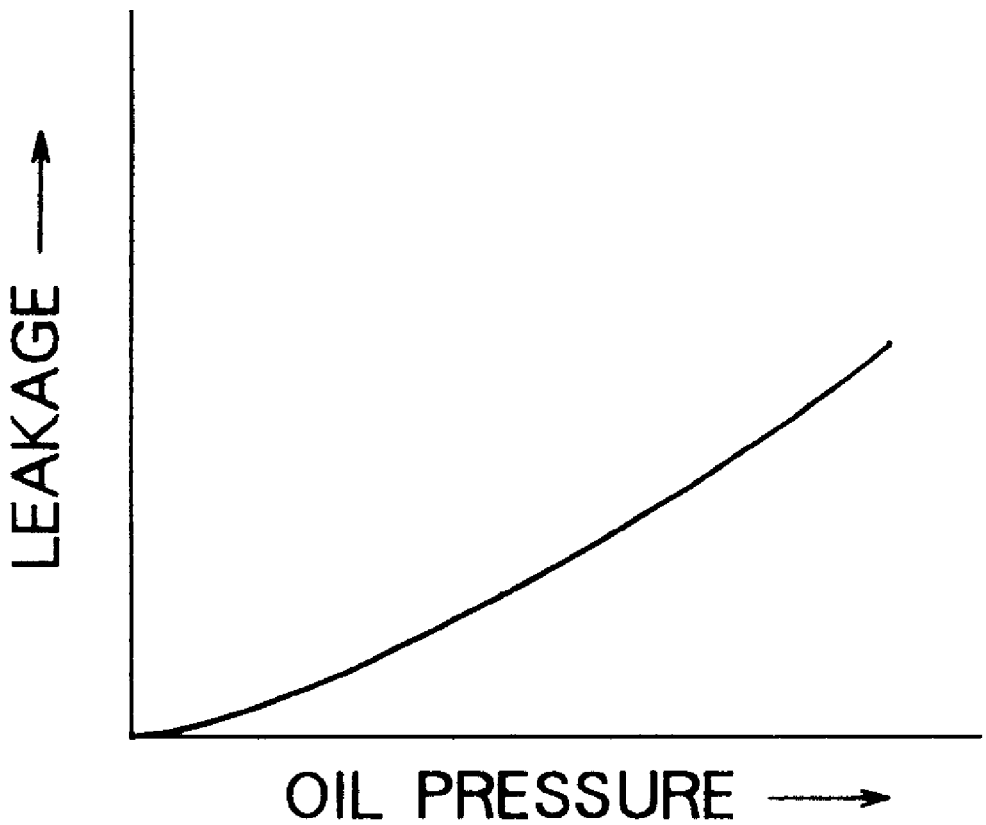
FIG. 2 is a graph showing a relation between leakage of operating oil from oil pipes in the injection device of the injection molding machine and pressure of the operating oil.

In the above hydraulic type injection device, the pressure of the operating oil acting on the injection cylinder increases when the above resistance increases. As the pressure of the operating oil increases, the leakage of the operating oil increases as shown in FIG. 2. As a result, the amount of the operating oil supplied to the injection cylinder decreases. In short, as the injection pressure increases, the injection speed, that is, the operating speed of the screw decreases and the leakage of the operating oil increases. The affection of the leakage of the operating oil therefore becomes considerable when the injection speed is low.

For this problem, there is a measure in which a speed of a piston 23 in the injection cylinder 10 is detected for a feedback control. In such a control, however, there is a defect that a response speed becomes low.

On the other hand, as the pressure of the operating oil increases, the operating oil is compressed, although the compression quantity of the operating oil is very little relative to that of gas. Since the compression quantity of the operating oil increases as the injection pressure becomes high, the affection of the compression quantity of the operating oil therefore becomes considerable when the injection speed is low.

Figure 3:
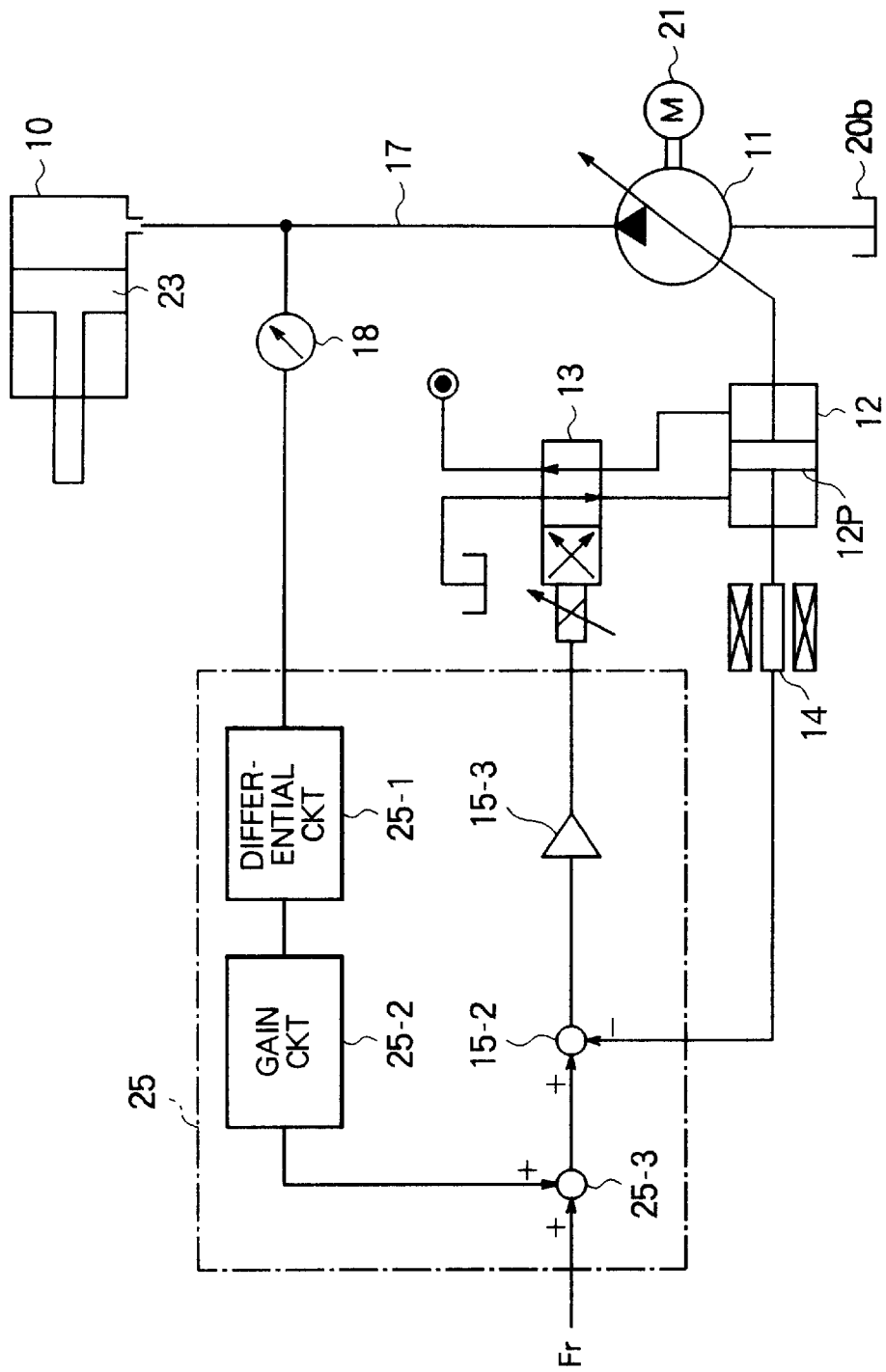
FIG. 3 is a diagram showing construction in which a control device according to a first embodiment of the present invention is applied to an injection device in a hydraulic type injection molding machine.

A control device for a slanting plate type variable capacity pump according to a first embodiment of the present invention will be described with reference to FIG. 3. In FIG. 3, the same parts as shown in FIG. 1 are denoted by the same reference numerals as in FIG. 1. The control device of FIG. 3 comprises a control section 25 which differs from that of the control section 15 shown in FIG. 1. The control section 25 has only a constitution required for such an injection speed control as described with FIG. 1. The control section 25 includes a differential circuit 25-1, a gain circuit 25-2 and an adder 25-3 in addition to the subtracter 15-2 and the amplifier 15-3 described with FIG. 1. The differential circuit 25-1, the gain circuit 25-2 and the adder 25-3 may collectively be called a correction circuit. As described with FIG. 1, a pressure of the operating oil is detected by the pressure detector 18 provided in the oil pipe 17.

Furthermore, in the present invention, the following conditions are presupposed.

(A) Discharge amount from the variable capacity pump 11 is in proportion to the position of the slanting plate. Control of the discharge amount from the variable capacity pump 11 is thus realized by controlling the position of the slanting plate.

(B) Speed of the piston 23 in the injection cylinder 10 is in proportion to the flow rate of the operating oil entering into the injection cylinder 10. Injection speed can thus be controlled by controlling the discharge amount from the variable capacity pump 11.

When the injection speed is controlled, the motor 21 is driven to supply the operating oil from the variable capacity pump 11 to the injection cylinder 10. A flow rate instruction value Fr according to the injection speed is given to the control section 25.

A pressure detection value is given from the pressure detector 18 to the control section 25. Because the leakage of the operating oil from the oil pipe 17 is in proportion to pressure change of the operating oil as described with FIG. 2, the above pressure detection value is differentiated in the differential circuit 25-1 of the control section 25 to obtain a pressure change quantity per unit time. The pressure change quantity is given to the gain circuit 25-2.

Because the leakage of the operating oil is also in proportion to the volume of the operating oil in the injection cylinder 10 and the oil pipe 17, a gain control according to the volume of the operating oil is performed in the gain circuit 25-2 to correct the pressure change quantity from the differential circuit 25-1. The gain circuit 25-2 outputs a corrected value, which is given to the adder 25-3. The adder 25-3 outputs a corrected flow rate value in which the flow rate instruction value is corrected with the above corrected value.

The subtracter 15-2 calculates the difference between the corrected flow rate value and a flow rate detection value from the position detector 14 and outputs a calculated difference as a flow rate variation. This flow rate variation is given to the electromagnetic proportional valve 13 through the amplifier 15-3. The electromagnetic proportional valve 13 controls the amount of the operating oil supplied to the drive cylinder 12, in accordance with the flow rate variation. The drive piston 12p is thereby driven to the right or left direction in the drawing. The position of the slanting plate in the variable capacity pump 11, that is, the discharge amount of the operating oil is controlled in accordance with the transfer amount of the drive piston 12p.

As described above, the position detector 14 detects the position of the slanting plate in accordance with the position of the drive piston 12p and gives a position detection value to the control section 25. The position detection value corresponds to a discharge amount of the operating oil from the variable capacity pump 11.

Also with reference to FIG. 4, a comparison between the conventional control device and the control device according to the first embodiment will be described in the case of the injection speed control.

When starting injection of molten resin into a mold, the injection speed is controlled in accordance with the flow rate instruction value Fr as described above. When a predetermined amount of resin is injected into the mold (the mold is almost filled with resin), the pressure in the mold abruptly increases. An abrupt load pressure then acts on the injection cylinder 10, as a result, the pressure of the operating oil in the oil pipe 17 increases.

When the pressure of the operating oil increases, the leakage of the operating oil increases. In the conventional control device, the injection speed thus decreases as shown by a solid line in FIG. 4. That is, the injection speed can not controlled into a constant value according to the flow rate instruction value Fr.

Figure 4:
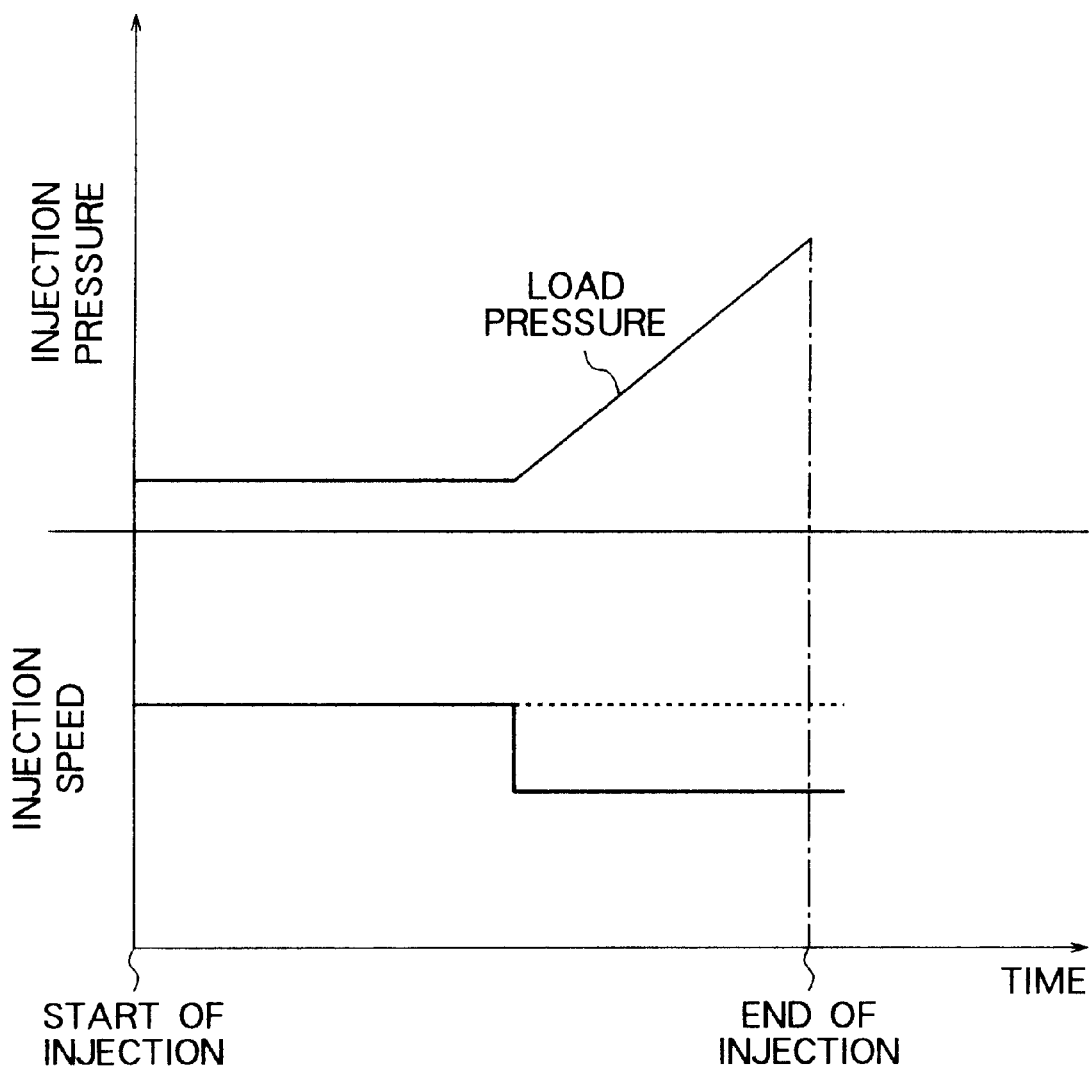
FIG. 4 is a graph showing a flow rate control operation of the control device of FIG. 3 in comparison with that of the prior art.

In contrast to this, in the control device according to the first embodiment, even when an abrupt load pressure acts on the injection cylinder 10 to increase the pressure of the operating oil, as shown by a broken line in FIG. 4, the injection speed can be kept constant till the end of injection because the flow rate instruction value is corrected in accordance with the pressure change of the operating oil as described above.

Figure 5:
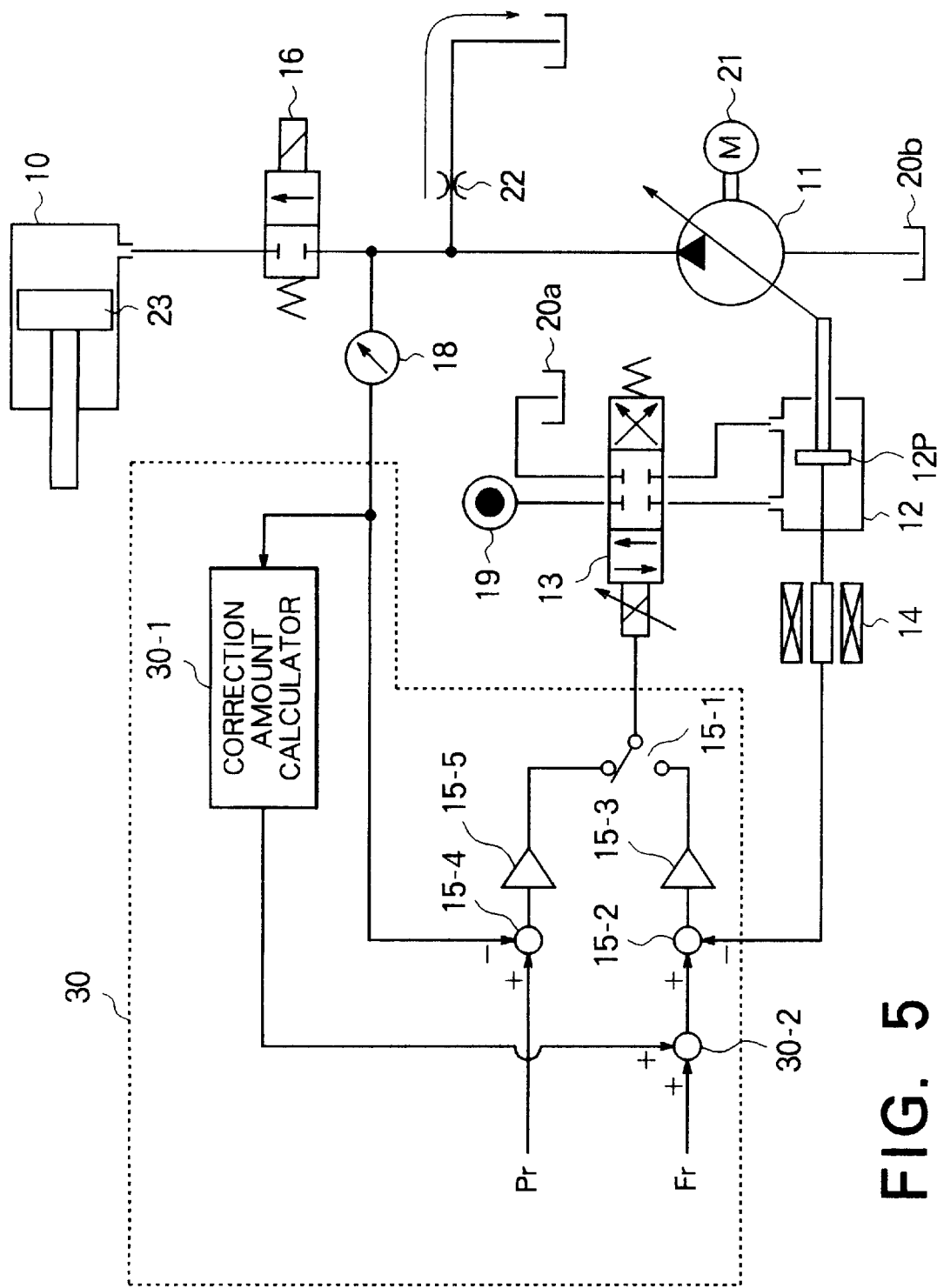
FIG. 5 is a diagram showing construction in which a control device according to a second embodiment of the present invention is applied to an injection device in a hydraulic type injection molding machine.

A control device for a variable capacity pump according to a second embodiment of the present invention will be described with reference to FIG. 5. FIG. 5 shows an instance in which the present invention is applied to an injection device in an injection molding machine similar to that in FIG. 1. Therefore, the same parts as shown in FIG. 1 are denoted by the same reference numerals as in FIG. 1 and their descriptions will be omitted.

The control device of this second embodiment comprises a control section 30 which differs from that of the control section 15 shown in FIG. 1. The control section 30 is characterized by comprising a correction amount calculator 30-1 and an adder 30-2 in addition to the constitution of the controller section 15 shown in FIG. 1. The correction amount calculator 30-1 is for obtaining a correction amount for a flow rate instruction value on the basis of a pressure detection value from the pressure detector 18 with reference to a correction table which shows a relation between the pressure of the operating oil supplied to the injection cylinder 10 and the correction amount of the position of the slanting plate. The correction table showing the relation between the pressure of the operating oil and the correction amount of the position of the slanting plate is previously prepared. In short, it is obtained from the following measurement.

At the time of starting the injection molding machine, a pressure control is performed in the state of closing the change-over valve 16 and the pressure of the operating oil and the position of the slanting plate following the pressure change are measured. The difference between positions of the slanting plate under a pressure and no pressure is calculated as a correction amount. Such calculations of correction amounts are carried out through the whole pressure range of the operating oil supposed when the injection speed is controlled. The correction table is made from a large number of correction amounts thus obtained and is stored in a memory of the correction amount calculator 30-1. The correction amount is added to a flow rate instruction value Fr in the adder 30-2 and the result of the addition is given to the subtracter 15-2 as a corrected flow rate instruction value.

Figure 6A:
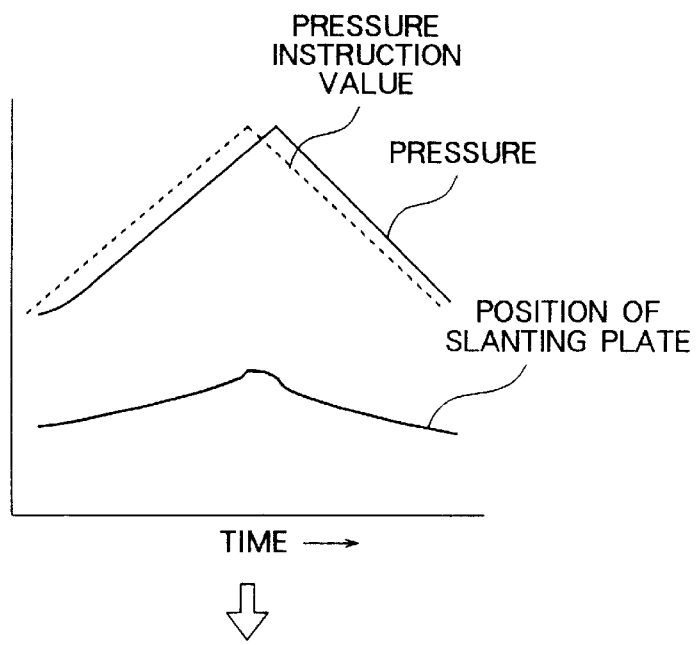
FIGS. 6A and 6B are graphs for explaining principle for calculating a correction amount of a position of a slanting plate in the present invention.
Figure 6B:
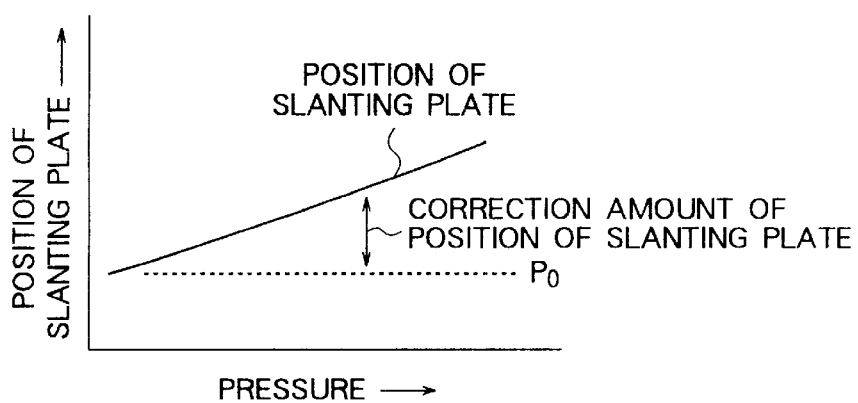
Figure 7:
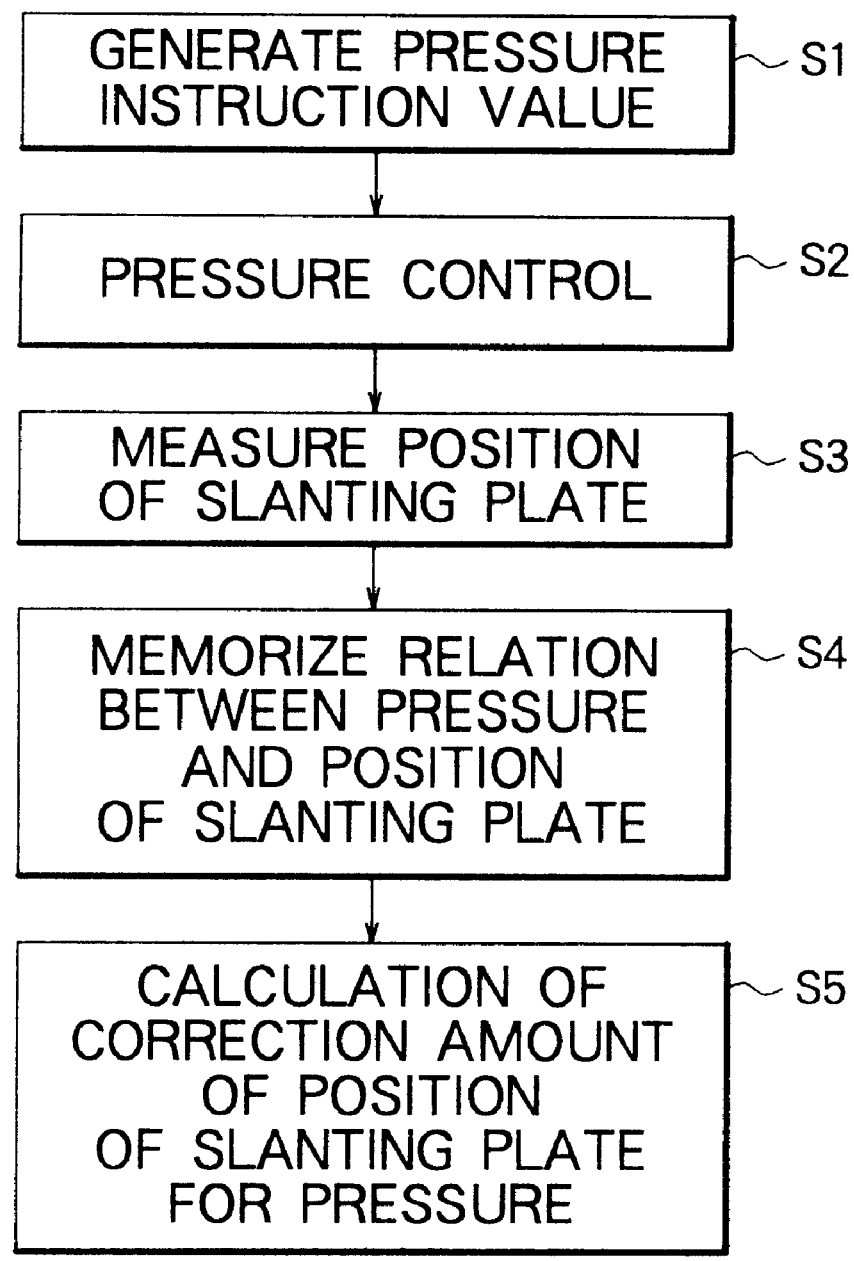
FIG. 7 is a flow chart showing a process for calculating the correction amount of the position of the slanting plate in the present invention.

Also with reference to FIGS. 6A, 6B, and 7, the correction amount calculator 30-1 will be described in detail. When a correction amount is calculated, the change-over valve 16 is closed and the change-over switch 15-1 is turned to the side of the amplifier 15-5 so as to select the injection pressure control. In a step S1, a pressure instruction value of a predetermined pattern as shown in FIG. 6A is given and the pressure is thereby controlled in a step S2. In a step S3, the position of the slanting plate at that time is measured by the position detector 14 and the pressure of the operating oil is measured by the pressure detector 18. In a step S4, the relation between the position of the slanting plate and the pressure of the operating oil is stored. For this purpose, the correction amount calculator 30-1 includes the memory.

At this state, since the change-over valve 16 is closed, the discharge amount from the variable capacity pump 11 coincides with the leakage of the operating oil from the oil pipe 17. The difference between the position of the slanting plate, which changes as shown in FIG. 6B in accordance with the pressure of the operating oil, and the position P0 of the slanting plate under no pressure of the operating oil is therefore equal to the transfer amount of the slanting plate which is required for a discharge amount from the variable capacity pump 11 corresponding to the leakage. In a step S5, the correction amount calculator 30-1 subtracts the slanting plate position P0 from the transfer amount of the slanting plate at each pressure and stores the result as a correction amount for the position of the slanting plate by each pressure. These correction amounts are stored in the form of the correction table in which they are made to correspond to pressures of the operating oil.

Next, the operation in the injection speed control will be described. In this case, the change-over switch 15-1 is turned to the side of the amplifier 15-3 and the change-over valve 16 is open. The correction amount calculator 30-1 reads out the corresponding correction amount in accordance with the pressure detection value obtained in the pressure detector 18, that is, a load pressure, from the memory and give it to the adder 30-2. The adder 30-2 adds the given correction amount to the flow rate instruction value Fr and give the result of the addition to the subtracter 15-2 as a corrected flow rate instruction value. As a result, the variable capacity pump 11 always discharges the operating oil with an extra amount corresponding to the leakage of the operating oil from the oil pipe 17. The injection cylinder 10 thus operates at the injection speed in proportion to the flow rate instruction value Fr with no affection of the leakage of the operating oil. As a result, an improved injection speed control performance can be obtained. The above-mentioned operation is applied to the compression of the operating oil.

In the above description, the present invention is applied to the injection device in the hydraulic type injection molding machine. But, not limited to such an injection molding machine, the present invention is also applicable to any other oil pressure driving system in which an oil pressure control is performed with a slanting plate type variable capacity pump.

What is claimed is:

1. A control device for a slanting plate type variable capacity pump for supplying a pressurized operating oil to a hydraulic cylinder in which the amount of the operating oil discharged from the variable capacity pump changes in proportion to a position change of a slanting plate, the control device comprising a drive piston for changing a position of the slanting plate in the variable capacity pump, an electromagnetic proportional valve for driving the drive piston and a position detector for detecting the position of the slanting plate, and a flow rate control of the operating oil being performed by controlling the electromagnetic proportional valve in accordance with a difference between a flow rate instruction value for the operating oil and a position detection value from the position detector so as to change the position of the slanting plate, the control device further comprising:

a pressure detector for detecting a pressure of the operating oil supplied to the hydraulic cylinder, and correcting means for correcting the flow rate instruction value on the basis of a pressure detection value from the pressure detector to output a corrected flow rate instruction value, the correcting means including differentiating means for differentiating the pressure detection value to obtain a pressure change quantity per unit time, gain control means for performing a gain control of the pressure change quantity with a predetermined gain to obtain a correction amount, and adding means for correcting the flow rate instruction value with the correction amount to output the corrected flow rate instruction value.

2. A control device for a slanting plate type variable capacity pump for supplying a pressurized operating oil to a hydraulic cylinder in which the amount of the operating oil discharged from the variable capacity pump changes in proportion to a position change of a slanting plate, the control device comprising a drive piston for changing a position of the slanting plate in the variable capacity pump, an electromagnetic proportional valve for driving the drive piston and a position detector for detecting the position of the slanting plate, and a flow rate control of the operating oil being performed by controlling the electromagnetic proportional valve in accordance with a difference between a flow rate instruction value for the operating oil and a position detection value from the position detector so as to change the position of the slanting plate, the control device further comprising:

a pressure detector for detecting a pressure of the operating oil supplied to the hydraulic cylinder, and correcting means for correcting the flow rate instruction value on the basis of a pressure detection value from the pressure detector to output a corrected flow rate instruction value, the correcting means including a memory which stores a correction table showing a relation between the pressure of the operating oil supplied to the hydraulic cylinder and the correction amount of the position of the slanting plate.

3. The control device as claimed in claim 2, wherein a valve is provided in an oil pipe for supplying the operating oil to the hydraulic cylinder, the slanting plate type variable capacity pump being started in operation at the state of closing the valve, the pressure change of the operating oil and the position of the slanting plate being measured, and, when the pressure of the operating oil has a value, the difference between the position of the slanting plate at that time and the position of the slanting plate at no pressure of the operating oil being calculated as the correction amount.

\* \* \* \* \*